June 3, 1930.  H. BURMEISTER  1,762,089
FIRE FIGHTING APPARATUS
Filed Feb. 10, 1928
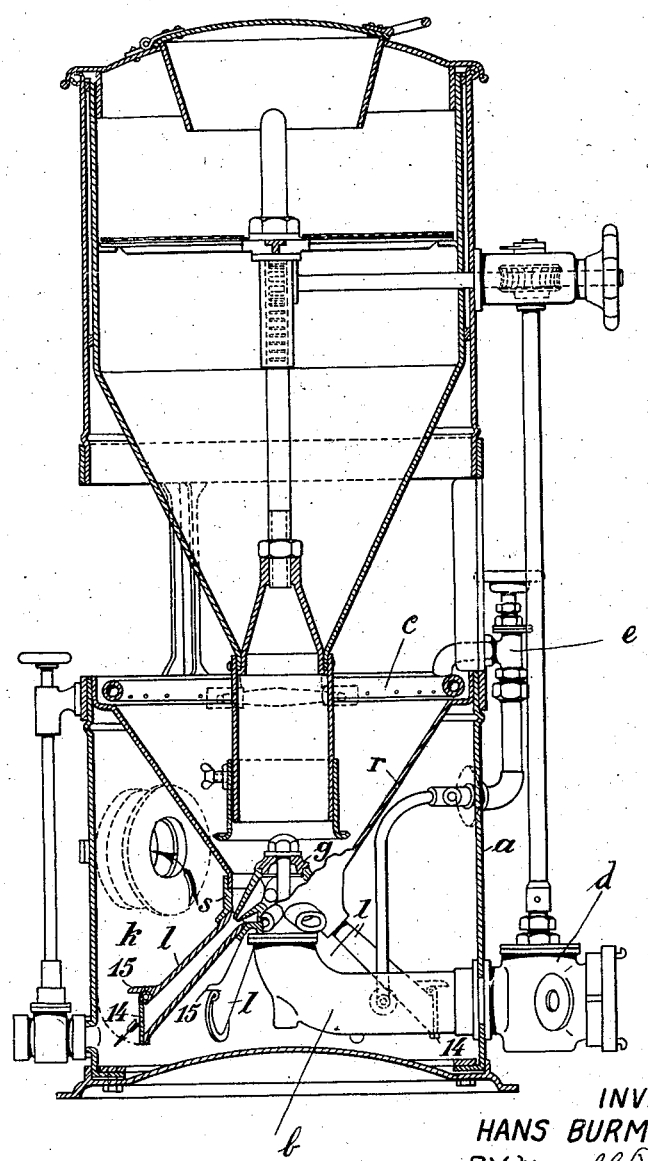
INVENTOR
HANS BURMEISTER
BY Maxwell Barnes.
ATTORNEY Patented June 3, 1930

1,762,089

UNITED STATES PATENT OFFICE

HANS BURMEISTER, OF BERLIN, GERMANY, ASSIGNOR TO PYRENE-MINIMAX CORPORATION, A CORPORATION OF DELAWARE

FIRE-FIGHTING APPARATUS

Application filed February 10, 1928, Serial No. 253,304, and in Germany February 11, 1927.

The present invention relates to fire fighting devices and has for an object to provide an improved apparatus of the type in which suitable chemicals are mixed with water for use in extinguishing fire.

The invention has been developed in connection with the production of apparatus for generating fire foam and such an apparatus will be described for the purpose of illustrating the principles involved, but it will be understood that the invention is not limited to this particular structure.

In the drawing forming a part hereof,—

The figure is a central sectional view of a foam generating apparatus embodying the principles of the invention.

The generator shown for the purpose of illustrating the invention comprises a hopper $r$ for foam forming chemicals and a mixing chamber $k$ formed in the casing $a$, together with suitable ejectors arranged to mix the chemicals with water and convey the mixture to the mixing chamber. As shown, water is supplied through an inlet $b$ to a head $g$ providing a plurality of nozzles which cooperate with suitable tapered outlets $l$ to form ejectors. The outlets $l$ are supported in a casing $s$ secured to the hopper $r$. In operation the chemicals in the hopper are washed into the ejectors by water entering through a suitable spray $c$ at the top of the hopper. The chemicals may be supplied to the hopper $r$ in any suitable manner.

The present invention provides means whereby any backflow from the mixing chamber $k$ into the ejectors or ejector outlets $l$ is prevented. As shown for the purpose of illustration, flap valves 14 are hinged to the outlets in position to be normally closed but so arranged as to be opened readily by the stream of liquid or foam issuing from the ejector. The valves of the several ejectors operate independently of each other whereby in the event of one ejector ceasing to operate for any reason the valve of that ejector will close to prevent backflow. The upward pivotal movement of the valves 14 is limited by projecting shoulders 15. The flow of water through the inlet $b$ and to the spray $c$ is controlled by suitable valves $d$ and $e$ as will be well understood.

The foregoing description of a particular apparatus is illustrative merely and is not intended as defining the limits of the invention.

I claim:

1. In apparatus for producing fire foam, in combination, a hopper for foam forming powder, a mixing chamber, a plurality of ejectors arranged to draw powder from the bottom of said hopper, mix it with water and convey it to said mixing chamber and a valve normally closing the outlet of each ejector and preventing back-flow from the mixing chamber to the ejector but arranged to open automatically to permit discharge from the ejector to the mixing chamber substantially as described.

2. In apparatus for producing fire foam, in combination, a hopper for foam forming powder, a mixing chamber, a plurality of ejectors arranged to draw powder from the bottom of said hopper, mixed with water and conveyed to said mixing chamber, means for admitting water to the hopper to wash the powder from the hopper toward the ejectors, and a valve normally closing the outlet of each ejector and preventing back-flow from the mixing chamber to the ejector but arranged to open automatically to permit discharge from the ejector to the mixing chamber substantially as described.

3. In apparatus for producing fire foam, in combination, a hopper for foam forming powder, a mixing chamber, a plurality of ejectors at the bottom of said hopper and operative to mix the foam forming powder and water and to convey the same to the mixing chamber, means for admitting water to said hopper to wash the powder therein downwardly to the ejectors, and a valve normally closing the outlet of each ejector to prevent back-flow from the mixing chamber to the ejector but arranged to open automatically to permit discharge from the ejector to the mixing chamber, substantially as described.

In testimony whereof, I have signed my name to this specification this 23d day of January, 1928.

HANS BURMEISTER.